United States Patent
Horner et al.

(10) Patent No.: US 12,167,117 B1
(45) Date of Patent: Dec. 10, 2024

(54) METHOD TO DETECT AND OPTIMIZE FOR SCAN APPROACH PATH

(71) Applicant: ZEBRA TECHNOLOGIES CORPORATION, Lincolnshire, IL (US)

(72) Inventors: Matthew Lawrence Horner, Sound Beach, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/516,606

(22) Filed: Nov. 21, 2023

(51) Int. Cl.
*G06K 7/14* (2006.01)
*G06T 7/246* (2017.01)
*G06T 7/80* (2017.01)
*H04N 23/61* (2023.01)
*H04N 23/74* (2023.01)

(52) U.S. Cl.
CPC ........... *H04N 23/61* (2023.01); *G06K 7/1413* (2013.01); *G06T 7/246* (2017.01); *G06T 7/80* (2017.01); *H04N 23/74* (2023.01)

(58) Field of Classification Search
CPC .......... H04N 23/61; H04N 23/74; G06T 7/80; G06T 7/246; G06K 7/1413
USPC .......................................................... 235/455
See application file for complete search history.

(56) References Cited

U.S. PATENT DOCUMENTS

| | | | |
|---|---|---|---|
| 11,334,734 B1 * | 5/2022 | Barkan | G06K 7/1491 |
| 2020/0193109 A1 * | 6/2020 | Peng | G06Q 30/0207 |
| 2023/0076008 A1 * | 3/2023 | Yepez | G07G 1/01 |

* cited by examiner

Primary Examiner — Daniel A Hess
(74) Attorney, Agent, or Firm — Yuri Astvatsaturov

(57) ABSTRACT

Methods and systems for detecting an object scan approach path and optimizing an imaging assembly in response to the scan path are provided. Image data captured from one or more fields of views is used to identify an object and determine, over a series of images, a scan path of that object relative to the imaging assembly. From the scan path, a lead-in side and a lead-out side of the imaging assembly are determined and used to adjust operating parameters of the imaging assembly to bias toward a right side scanning configuration, a left side scanning configuration, or a central scanning configuration. These operating parameters may include adjusting the wakeup, exposure, illumination, indicia identification, and scan avoidance configurations, for example, for optimum scan path operation.

21 Claims, 9 Drawing Sheets

METHOD TO DETECT AND OPTIMIZE FOR SCAN APPROACH PATH

BACKGROUND

Traditionally, when handsfree scanners are installed by a customer, the scanner can be installed to accommodate "left-handed" or "right-handed" checkout lanes at the customer's location. Unlike a handheld scanner with an aimer, items to decode arrive from the edges of the field of view and travel across that field of view. Furthermore, scanners in the same customer location may be installed 180° opposite another. That is, some scanners may be installed for items to appear from a left-hand side, i.e., scanning an item moving from left to right, while other scanners may be installed for items to appear from a right-hand side.

However, there is no way for a scanner to determine which edge it should bias to for capture items entering a field of view. Therefore, there is no way for a scanner to optimize itself for item scanning speed and throughput.

These limitations manifest in various ways for different types of scanners. For scanners with a presentation mode where the scanner is not attempting to image, there is no way to know which portion of the image to prioritize in looking for changes that indicate the device should "wakeup". For scanners containing two cameras in a tower configuration, there is no way to determine which camera should take the first image. Furthermore, the image processing search algorithms within scanners do not have an area to bias towards, to start searching, as with devices with laser aimers where it can be assumed the customer is using the aimer to point at the barcode.

Accordingly, there is a need for scanners that can be optimized depending on an item approach path.

SUMMARY

In an embodiment, the present invention is a computer-implemented method to detect for a scan approach path for an imaging assembly. The method may comprise capturing, via the imaging assembly, image data of an object appearing one or more fields of view (FsOV), wherein the image data comprises a plurality of sequentially captured images of the object in the one or more FsOV, the one or more FsOV defining a scan region having a first scan side and a second scan side opposite the first scan side; detecting, at one or more processors, the object in at least some of the sequentially captured images and determining, at the one or more processors, a direction of movement of the object along a scan path within the scan region; from the direction of movement of the object, determining, at the one or more processors, which of the first scan side and the second scan side is a lead-in scan side and/or which of the first scan side and the second scan side is lead-out scan side; responsive to determining the lead-in scan side and/or the lead-out scan side, adjusting, at the one or more processors, operating parameters of the imaging assembly from a first scan path dependent configuration to a second scan path dependent configuration; and capturing, via the imaging assembly having the second scan path dependent configuration, subsequent image data over the one or more FsOV.

In a variation of this embodiment, detecting the object in each of the sequentially captured images comprises detecting an indicia associated with the object; and wherein determining the direction of movement of the object is determined from determining a position of the indicia in each of the sequentially captured images.

In a variation of this embodiment, detecting the object in each of the sequentially captured images comprises identifying image features associated with the object; and wherein determining the direction of movement of the object is determined from determining a position of the image features in each of the sequentially captured images.

In a variation of this embodiment, the image features are selected from the group consisting of edges of the object, text associated with the object, and color, hue, or saturation associated with the object.

In a variation of this embodiment, the method further comprises determining the direction of movement of the object from analyzing a threshold number of sequentially captured images.

In a variation of this embodiment, the sequentially captured images are continuously captured images.

In a variation of this embodiment, the threshold number of sequentially captured images are a first n images captured by the imaging assembly after an initiating event at the imaging assembly, where n is an integer less than 10.

In a variation of this embodiment, the operating parameters of the imaging assembly comprise a wakeup property, an imaging sensor exposure property, an illumination property, a barcode identification property, or a scan avoidance property.

In a variation of this embodiment, the operating parameters comprise the wakeup property, and wherein in the first scan path dependent configuration the imaging assembly is configured to perform a wakeup in response to an initial object entering the scan region from the first scan side and not from the initial object entering the scan region from the second scan side, and wherein in the second scan path dependent configuration the imaging assembly is configured to perform a wakeup in response to objects entering from the second scan side and not from objects entering from the first scan side.

In a variation of this embodiment, the operating parameters comprise the imaging sensor exposure property, and wherein in the first scan path dependent configuration the imaging assembly is configured to examine a portion of the image data corresponding to the first scan side of the scan region in detecting a subsequent object and to not examine a portion of the subsequent image data corresponding to the second scan side of the scan region.

In a variation of this embodiment, the operating parameters comprise the imager illumination property, and wherein in the first scan path dependent configuration the imaging assembly is configured to illuminate a portion of the one or more FsOV corresponding to the first scan side of the scan region in detecting a subsequent object and to not illuminate a portion of the FsOV corresponding to the second scan side of the scan region.

In a variation of this embodiment, the operating parameters comprise the barcode identification property, and wherein in the first scan path dependent configuration the imaging assembly is configured to identify a barcode appearing in a portion of the subsequent image data corresponding to the first scan side of the scan region and to not identify a barcode appearing in a portion of the subsequent image data corresponding to the second scan side of the scan region.

In a variation of this embodiment, the operating parameters comprise the scan avoidance property, and wherein in the first scan path dependent configuration the imaging assembly is configured to avoid performing scanning processing on objects appearing in the portion of the subsequent image data corresponding to the lead-out scan side.

In a variation of this embodiment, the method further comprises determining a number, n, of sequentially captured images in the subsequent image data that contain an object in the portion of the subsequent image data corresponding to the first scan side; and in response to n being less than a threshold, performing a mitigating operation at the imaging assembly.

In a variation of this embodiment, the mitigating operation is one or more of an audible indicator, a visual indicator, communicating an error signal to a remote processing station, or further adjusting the operating parameters of the imaging assembly.

In a variation of this embodiment, the method further comprises determining, at the one or more processors, a scan speed of the object within the scan region; and wherein adjusting the operating parameters of the imaging assembly from the first scan path dependent configuration to the second scan path dependent configuration depends upon the scan speed.

In a variation of this embodiment, the method further comprises responsive to adjusting the operating parameters of the imaging assembly from the first scan path dependent configuration to the second scan path dependent configuration, generating a scan direction indication to a user or an instruction to change an orientation of the imaging assembly.

In a variation of this embodiment, the first scan side is a left side the scan region and wherein the second scan side is a right side of the scan region.

In a variation of this embodiment, the first scan side is a distal position of the scan region and wherein the second scan side is a proximal position of the scan region.

In another embodiment, the present invention is a device for detecting a scan approach path for an imaging assembly. The device comprises one or more processors; and one or more memories storing instructions thereon that, when executed by the one or more processors, are configured to cause the one or more processors to: capture, via the imaging assembly, image data of an object appearing one or more fields of view (FsOV), wherein the image data comprises a plurality of sequentially captured images of the object in the one or more FsOV, the one or more FsOV defining a scan region having a first scan side and a second scan side opposite the first scan side; detect, at one or more processors, the object in at least some of the sequentially captured images and determine, at the one or more processors, a direction of movement of the object within the scan region; from the direction of movement of the object, determine, at the one or more processors, which of the first scan side and the second scan side is a lead-in scan side and/or which of the first scan side and the second scan side is lead-out scan side; responsive to determining the lead-in scan side and/or the lead-out scan side, adjust, at the one or more processors, operating parameters of the imaging assembly from a first scan path dependent configuration to a second scan path dependent configuration; and capture, via the imaging assembly having the second scan path dependent configuration, subsequent image data over the one or more FsOV.

In yet embodiment, the present invention is a tangible machine-readable medium comprising instructions for detecting a scan approach path for an imaging assembly that, when executed, cause a machine to at least: capture, via the imaging assembly, image data of an object appearing one or more fields of view (FsOV), wherein the image data comprises a plurality of sequentially captured images of the object in the one or more FsOV, the one or more FsOV defining a scan region having a first scan side and a second scan side opposite the first scan side; detect, at one or more processors, the object in at least some of the sequentially captured images and determine, at the one or more processors, a direction of movement of the object within the scan region; from the direction of movement of the object, determine, at the one or more processors, which of the first scan side and the second scan side is a lead-in scan side and/or which of the first scan side and the second scan side is lead-out scan side; responsive to determining the lead-in scan side and/or the lead-out scan side, adjust, at the one or more processors, operating parameters of the imaging assembly from a first scan path dependent configuration to a second scan path dependent configuration; and capture, via the imaging assembly having the second scan path dependent configuration, subsequent image data over the one or more FsOV.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
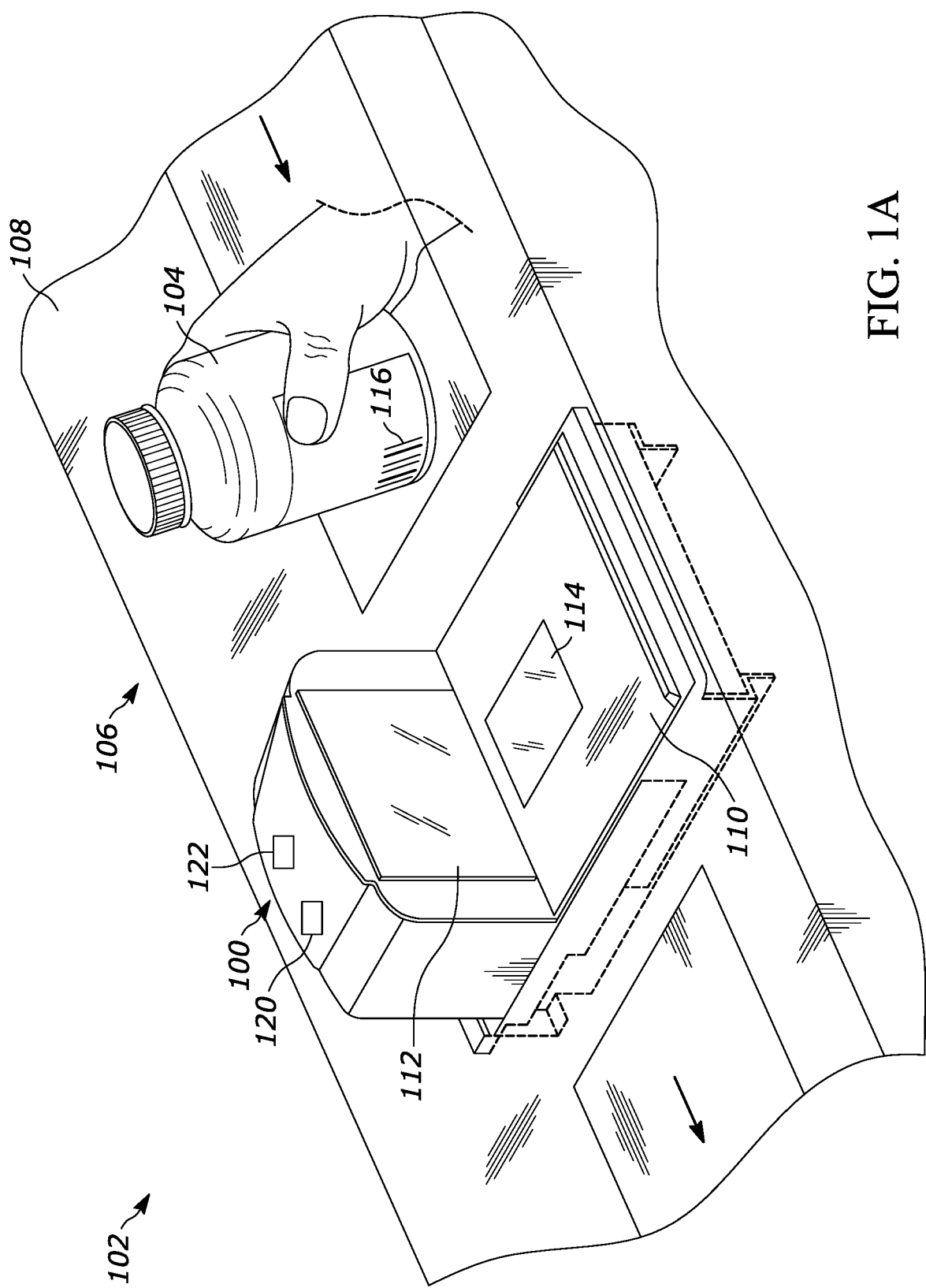
FIGS. 1A and 1B are perspective views of a bioptic barcode reader, implemented in a point-of-sale (POS) system, with FIG. 1A illustrating an example right-to-left scan path and FIG. 1B illustrating an example left-to-right scan path, and that that may be used to implement inventive concepts described here.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1B:
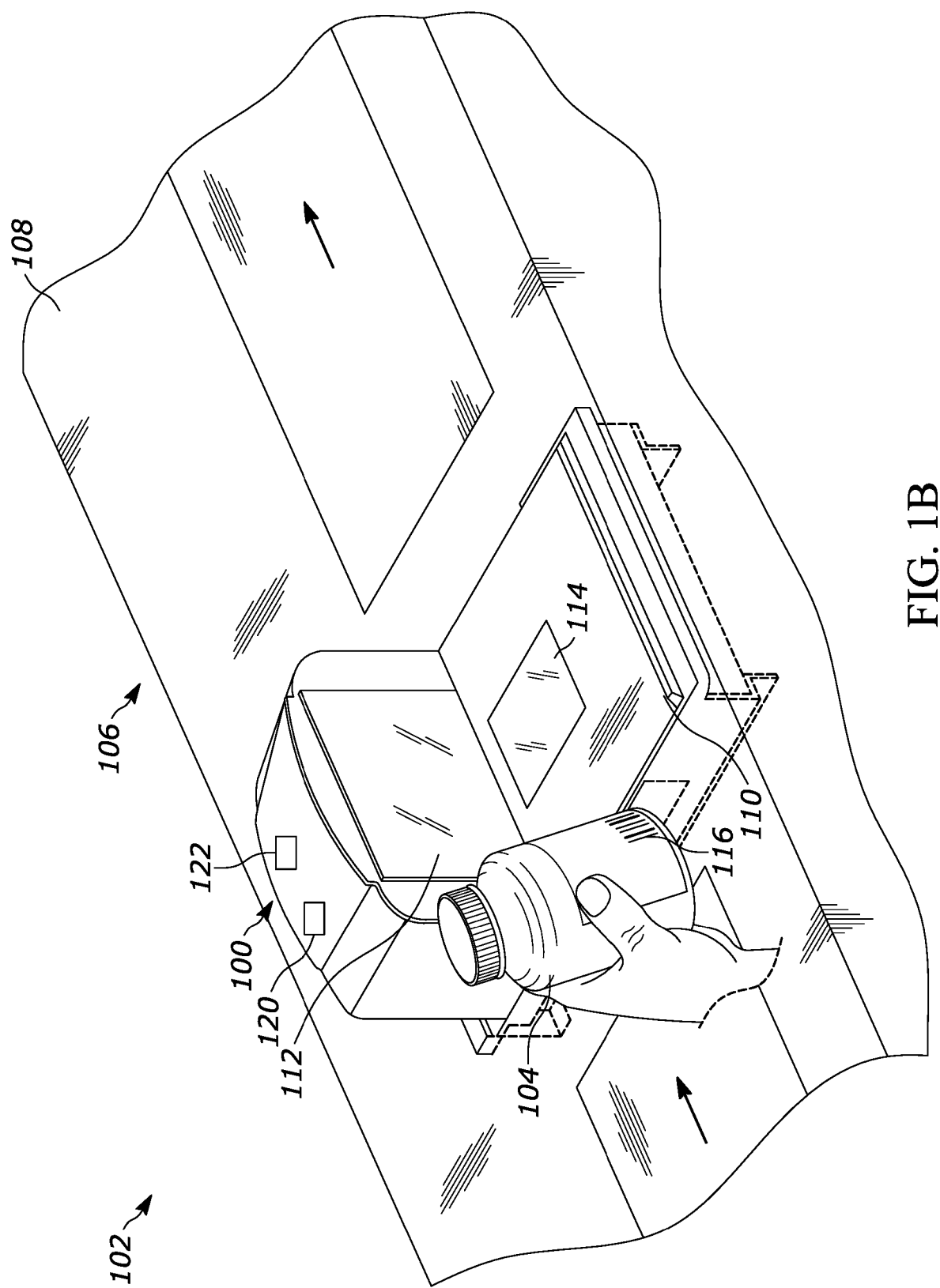

FIGS. 1A and 1B are perspective views of a prior art data imaging-based data capture device in the form of a bioptic indicia (e.g., barcode) reader 100, implemented in a prior art point-of-sale (POS) system 102, showing capture of an image of a target object 104 being swiped across the bioptic barcode reader 100 scanning area. In FIG. 1A, the target object 104 is swiped across from right to left when facing the bioptic barcode reader 100. In contrast, in FIG. 1B, the target object 104 is swiped from left to right. The POS system 102 includes a workstation 106 with a counter 108, and the bioptic indicia reader 100. The bioptic indicia reader 100 includes a weighing platter 110, which may be a removable or a non-removable. Typically, a customer or store clerk will pass the target object 104 across at least one of a substantially vertical imaging window 112 or a substantially horizontal imaging window 114 to enable the bioptic indicia reader 100 to capture one or more images of the target object 104, including the barcode 116. However, as shown in the examples of FIGS. 1A and 1B, the customer or clerk may swipe an object from either side. Typically, the POS system 102 is orientated for a preferred swipe direction, for example, by positioning the POS system 102 between a shopping cart area (not shown) on one scan side and a bagging area (not shown) on the other scan side, thereby establishing one scan side as the lead-in scan side and the other scan side as the lead-out scan side, respectively. However, in various environments, barcode readers may be positioned such some of them have a lead-in scan side on the right side (with lead-out on the left side) when facing the reader and some can have the lead-in scan side on the left side (with lead-out on the right side). Prior art barcode readers, as shown, are unable to determine the particular swipe direction, but rather must be programmed by a customer or designer for the particular swipe direction desired.

In the example shown, as part of the clerk passing the target object 104 across the imaging windows 112, 114, the bioptic indicia reader 100 may utilize an illumination source 120 during an inactive period/state characterized by the illumination source 120 emitting a relatively low level of illumination to allow the imaging sensor 122 to capture image data of the weighing platter 110 at a reduced/low capture rate and/or otherwise modified manner. When the image data indicates an object present within the FOV of the imaging sensor 122, the bioptic indicia reader 100 may cause the illumination source 120 and imaging sensor 122 to "wakeup," into an active period/state in that the illumination source 120 may emit a higher level of illumination than during the inactive period/state, and the imaging sensor 122 may capture subsequent image data at an increased/high capture rate and/or otherwise modified manner relative to the inactive period/state. In this manner, the prior art bioptic indicia reader 100 may cause the imaging sensor 122 to capture image data of the target object 104 and/or the barcode 116 during the active period/state for potential decoding of the barcode 116.

However, this conventional wakeup sequence depends upon the swipe direction of the indicia reader 100, namely whether the indicia reader 100 is installed with the right scan side or the left scan side as the lead-in scan side. Namely, depending upon the presumed swipe direction at installation, the illumination source 120 and the imaging senor 122 emitting illumination and/or capturing image data through the substantially vertical imaging window 112 and/or the substantially horizontal imaging window 114 will be configured with a bias toward one side or the other. If the indicia reader 100 is configured for the right scan side as the lead-in scan side, as shown in FIG. 1A, then the indicia reader 100 may not properly wakeup with the object 104 is swiped from the left side, as shown in FIG. 1B. The indicia reader 100 may be delayed in waking up or it may fail to wake up. This incorrect orientation relative to the swipe direction can create numerous problems, such as not enough illumination emitting from the illumination source 120, failure to identify the barcode 116 on the object 104, or accidental scanning/re-scanning of the barcode 116.

Figure 2:
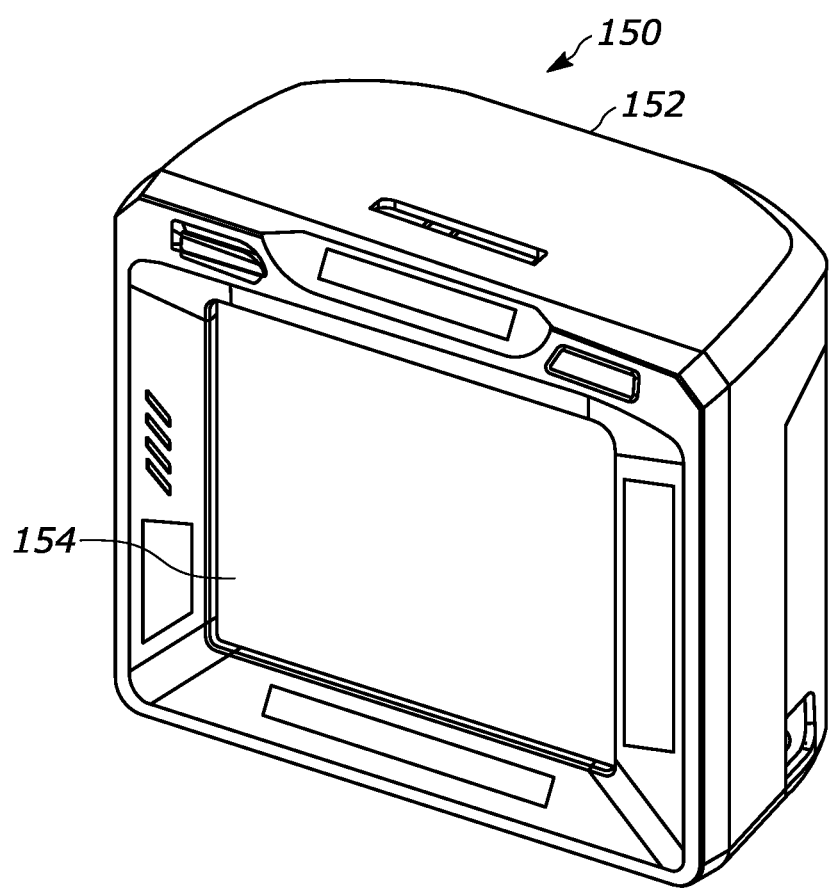
FIG. 2 is a perspective view of another example barcode reader that may be used to implement inventive concepts described here.

The issue may be compounded in other types of scanners. For example, FIG. 2 illustrates another example of an indicia reader 150, sometimes referred to as a slot scanner. In the example shown, indicia reader 150 has a housing 152 and a window 154, which faces a product scanning area, to allow a set of optical components positioned within housing 152 to direct at least one field-of-view through window 154. Indicia reader 150 operates on a similar principle as the indicia reader 100 of FIG. 1A. However, it is generally smaller (typically having a window that is smaller than 5 inches across), includes a single window, and, while it could be installed in a slot of a counter (functioning like the bottom portion of the bioptic indicia reader 100), it can also be used as a stationary scanner positioned on a working surface (functioning like the upper portion of the bioptic indicia reader 100).

In these conventional slot scanners, the indicia decoding process (and by extension, the checkout process) can be needlessly delayed while a user/customer attempts to adequately position the target object 104 in a manner sufficient to trigger the conventional wakeup sequence. But depending on whether the user/customer swipes the object 104 from one lead-in scan side or the other or whether the object starts further away or closer to the window 154, the wakeup operation may fail or the be delayed, in a similar manner to that of the bioptic indicia reader 100.

To resolve these issues with conventional systems, the present disclosure provides technologies for detecting a scan approach for an imaging-based data capture device, such as an imaging assembly in the form of an indicia reader or machine vision camera. In various examples, an indicia reader captures image data of an object appearing one or more fields of view (FsOV), for example, through sequentially captured images of the object. These sequentially captured images may be the first n images captured by the indicia reader, for example. The sequentially captured images may be continuously captured images (frames), that is, each image immediately filing after another, or the sequentially captured images may be any number or any sequence of images captured over a threshold time period, after a triggering event. That is, sequentially captured images herein includes one or more subsequent images captured after a preceding image irrespective of whether those subsequent images are captured immediately after the preceding image or are selected from among a series of images that were captured after the preceding image. From these captured images, the indicia reader detects the object in each of the sequentially captured images and determines a direction of movement of the object along the scan path. From that determined direction of movement of the object along the scan path, the indicia reader determines which scan side is a lead-in scan side and/or which scan side is lead-out scan side. Response to that determination, the indica reader adjusts operating parameters of the indicia reader, e.g., of an imaging assembly therein, from one scan path dependent configuration to a different scan path dependent configuration. The indicia reader can perform each of these operations thereby avoiding the new of using a separate setup computer processor with complex graphic user interface and executing specifically designed setup software. Instead, a user of the indicia reader (i.e., any imaging-based data capture device) is able to facilitate the setup of the indicia reader for different scan approach path orientations by simply triggering an orientation setup mode and moving an object across the one or more FsOV, where the one or more FsOV define a scan region for the imaging assembly.

Figure 3:
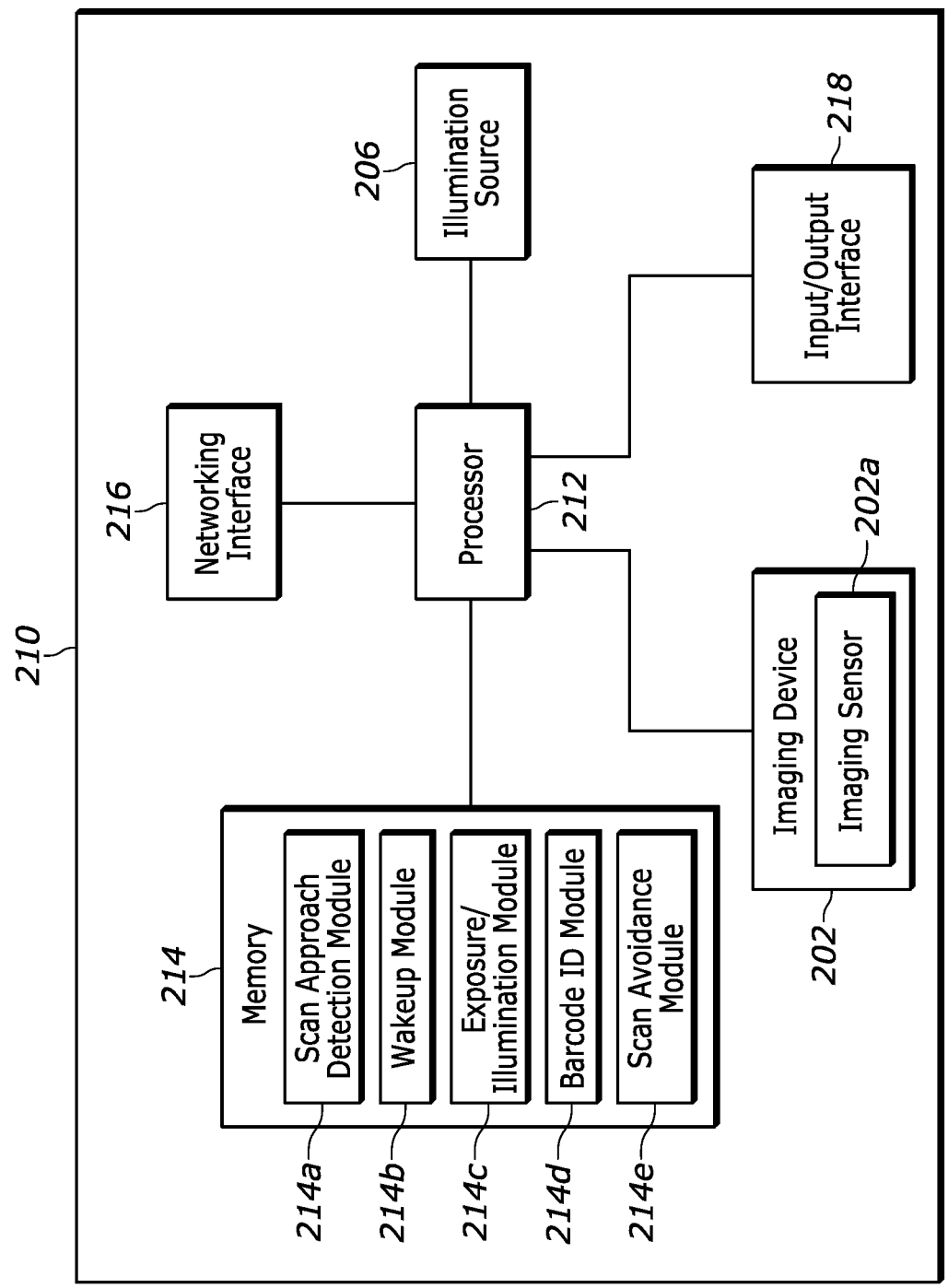
FIG. 3 is a block diagram of an example logic circuit for implementing example methods and/or operations described herein.

To detect a scan approach path and use that for operating parameter optimization, a block diagram of an example logic circuit for an imaging assembly is shown in FIG. 3. The logic circuit is capable of implementing, for example, one or more components of the example systems and methods described herein. The example logic circuit of FIG. 3 is a processing platform 210 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 210 of FIG. 3 includes a processor 212 such as, for example, one or more microprocessors, controllers, and/or any suitable type of processor. The example processing platform 210 of FIG. 3 includes memory (e.g., volatile memory, non-volatile memory) 214 accessible by the processor 212 (e.g., via a memory controller). The example processor 212 interacts with the memory 214 to obtain, for example, machine-readable instructions stored in the memory 214 corresponding to, for example, the operations represented by the flowcharts of this disclosure. Additionally, or alternatively, machine-readable instructions corresponding to the example operations described herein may be stored on one or more removable media (e.g., a compact disc, a digital versatile disc, removable flash memory, etc.) that may be coupled to the processing platform 210 to provide access to the machine-readable instructions stored thereon.

As an example, the example processor 212 may interact with the memory 214 to access and execute instructions related to and/or otherwise comprising a scan approach detection module 214a and various operating modules, including, in the illustrated example, a wakeup module 214b, an exposure/illumination module 214c, a barcode identification module 214d, and a scan avoidance module 214e.

The wakeup module 214b may generally include instructions that cause the processors 212 to: cause one or more illumination sources 206 to emit illumination; cause the imaging device 202 to capture image data representative of an environment appearing within one or more FsOV (e.g., via the imaging sensor 202a); determine, based on the image data, a direction of movement of the object along a scan path within the one or more FsOV; determine which scan side of the imaging assembly is a lead-in scan side and/or which is a lead-out scan side; and adjust operating parameters of one or more of the modules 214b, 214c, 214d, and 214e, from a first scan path dependent configuration to a second scan path dependent configuration, to optimize the imaging assembly for subsequent objects scanned at the imaging assembly.

The exposure/illumination module 214c may control an exposure time of the imaging sensor 202a and which location of the imaging sensor 202a is examined for object and/or indicia identification. In the example of an imaging sensor 202a that contains multiple imaging sensors, for example each corresponding to a different FOV, the module 214c may control which imaging sensor is examined for object and/or indicia identification. Further, the exposure/illumination module 214c may control the amount of illumination provided by the illumination source 206 and the location of that illumination, for example, in the example where the illumination source 206 contains multiple illumination sources each illuminating a different.

The barcode identification module 214d is provided by way of example and may be any suitable indicia identification module or any suitable object identification module. The barcode identification module 214d in some examples may be configured to search for and identify objects in only a portion of the captured image data. Likewise, the scan avoidance module 214e may be configured to perform scan avoidance determinations by analyzing only a portion of the captured image data for false or erroneous scan events.

Each of the modules 214b, 214c, 214d, and 214e may store a plurality of different scan path dependent configurations. These scan path dependent configurations may include operating parameters or other instructions that tailor operation of the module for operating the imaging assembly in configurations optimized (relative to the other configurations) for objects having a scan path that is generally in one direction versus another direction. For example, in some examples and as discussed further below, the modules 214b, 214c, 214d, and 214e may each store separate configurations for a left-to-right side scanning (also referred to herein as a left side sensitivity), a right-to-left side scanning (also referred to herein as a right side sensitivity), and a central scanning (also referred to herein as a platform scanning mode). As discussed further, in various examples, which of these configurations are implemented by the modules may be determined by the scan approach detection module 214a.

As illustrated in FIG. 3, the first imaging apparatus 202 includes imaging sensor(s) 202a. The imaging sensor(s) 202a may include one or more sensors configured to capture image data corresponding to a target object, an indicia associated with the target object, and/or any other suitable image data. More generally, the imaging sensor(s) 202a may be or include a visual imager (also referenced herein as a "vision camera") with one or more visual imaging sensors that are configured to capture one or more images of a target object. Additionally, or alternatively, the imaging sensor(s) 202a may be or include a barcode scanner with one or more barcode imaging sensors that are configured to capture one or more images of an indicia associated with the target object. Moreover, the illumination source 206 may generally be configured to emit illumination during a predetermined period in synchronization with image capture of the imaging device 202. The imaging device 202 may be configured to capture image data during the predetermined period, thereby utilizing the illumination emitted from the illumination source 206.

The example processing platform 210 in FIG. 3 also includes a network interface 216 to enable communication with other machines via, for example, one or more networks. The example network interface 216 includes any suitable type of communication interface(s) (e.g., wired and/or wireless interfaces) configured to operate in accordance with any suitable protocol(s). For example, in some embodiments, networking interface 216 may transmit data or information (e.g., imaging data and/or other data described herein) between the processing platform 210 and any suitable connected device(s).

The example, processing platform 210 of FIG. 3 also includes input/output (I/O) interfaces 218 to enable receipt of user input and communication of output data to the user.

Figure 4:
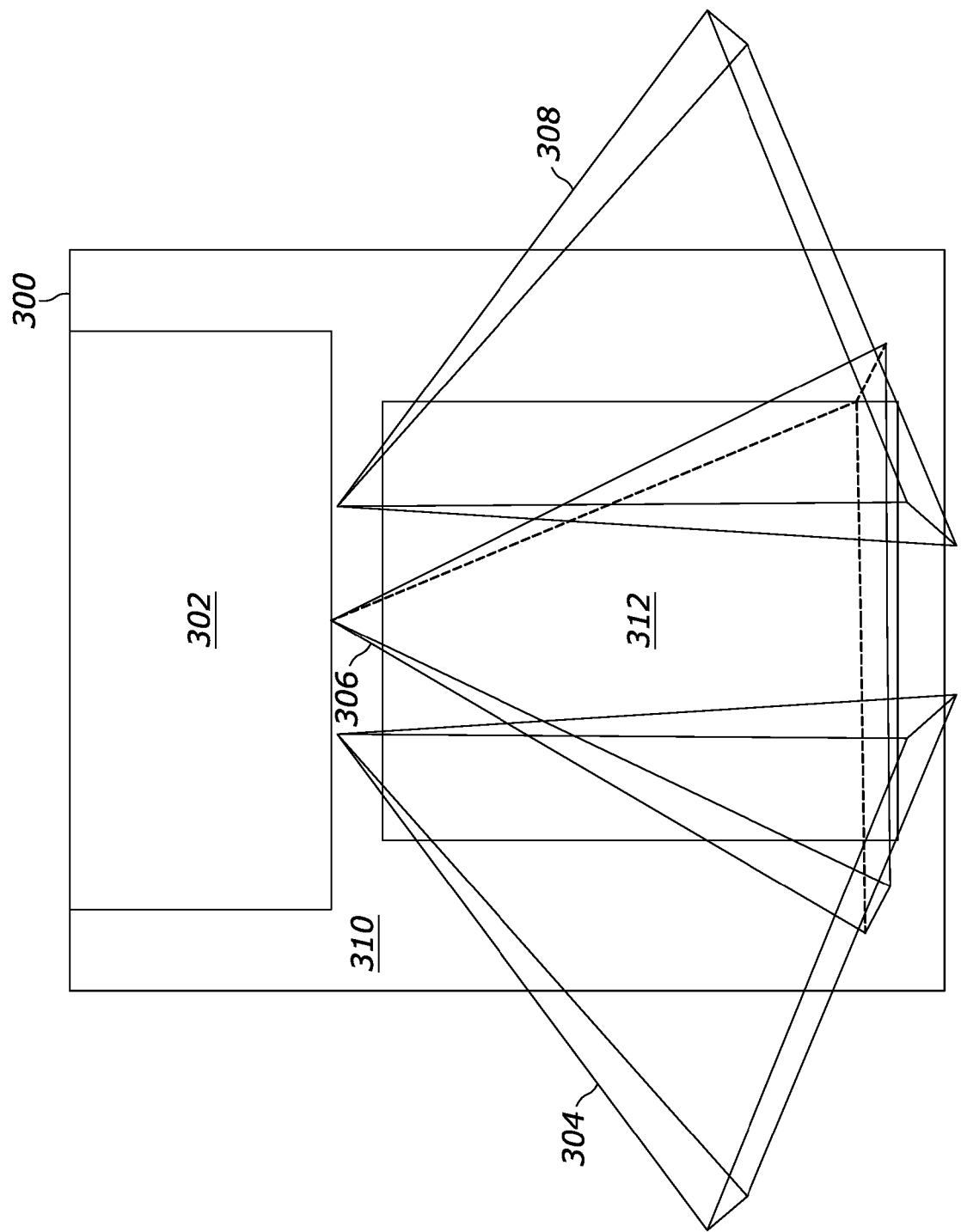
FIG. 4 is a view of another example barcode reader illustrating right scan side and left scan side fields of view and that may be used to implement inventive concepts described here.
Figure 5:
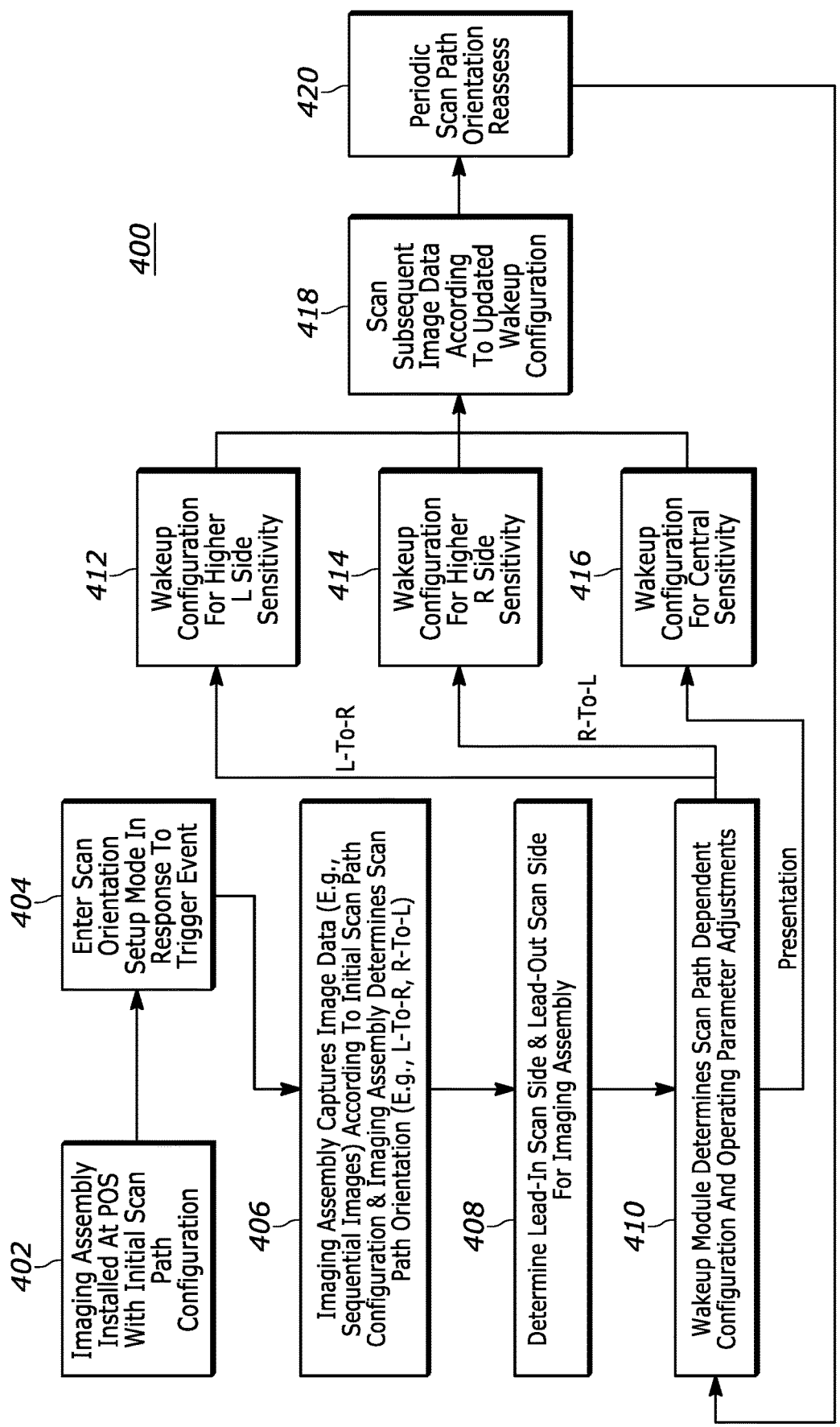
FIG. 5 illustrates an example method for adjusting imaging system wakeup depending on scan path orientation, in accordance with embodiments disclosed herein.

FIG. 5 illustrates an example method 400 for detecting a scan approach path of an object and adjusting the configuration of an imaging assembly based on the detected path, in accordance with embodiments disclosed herein. It should be appreciated that the actions described herein in reference to the example method 400 of FIG. 5 may be performed by any suitable components described herein, such as indicia readers 100, 150, and 300, logic circuit 210, and/or combinations thereof. FIG. 4 illustrates an example imaging assembly 300 in the form of a bioptic having a tower portion 302 with one or more imaging sensors (not shown) that define, in the illustrated example, three different fields of view (FsOV) 304, 306, and 308, corresponding to a left side bias, a central bias, and a right side bias, respectively. These FsOV 304, 306, and 308 are generally horizontally directed to extend at least partially over a platter portion 310 that has an exit window 312 under which another one or more imaging sensors (not shown) may be positioned. Those one or more platter mounted imaging sensors may have a generally vertically directed FsOV (not shown).

The method 400 includes installing (at block 402) an imaging assembly (e.g., a bioptic indicia reader, slot scanner, machine vision camera, or other imaging-based data capture device, etc.) at point of sale (POS) location. In this way, the imaging assembly may be installed with an initial default scan path dependent configuration (such as left-to-right or right-to-left configuration). At a block 404, the process 400 may enter a scan orientation setup mode in response to a trigger such as via a user pulling a physical trigger on an indicia decoder, detection of the presence of an object entering a field of view of the imaging assembly, successfully scanning a barcode, either on the object or a specifically encoded setup barcode.

In response to entering the scan orientation setup mode at block 404, a block 406 begins capturing image data, for example, by emitting, using an illumination source of the imaging assembly, illumination oriented towards the entire field of view of the imaging assembly or directed to an initial presumptive object scan side of the imaging assembly. In some examples, the block 406 captures a plurality of sequentially captured images as the captured image data. At the block 406, the process 400 may perform object recognition on the captured images identifying the desired object in each of the sequentially captured images and determining a direction of movement of the object along a scan path within the scan region. That is, the block 406 determines if the object is being scanned from left-to-right, right-to-left, or along some central axis toward or away from am imaging assembly. In some examples, the method 400 determines the scan path approach by, for example, performing the following process techniques. An initial triggering event occurs, and a series of sequential images are captured over time. An object is identified in each sequentially captured image, and from that the method 400 (at block 406) compares the position of the object the sequentially captured images and determines (i) a direction of object indicating a direction of movement of the object along a scan path, and optionally (ii) a scanning speed of the object along that scan path.

While the blocks 404 and 406 are shown separately, in various examples, the process 400 may be executed with one or more of the operations of these blocks combined. Further, in various examples, the method 400 may detect the same object in each of the sequentially captured images by identifying an indicia (e.g., a fully-decodable indicia or a partially-decodable indicia) associated with the object in the captured images. From that, the method 400 may determine the direction of movement of the object along the scan path by determining a position of the fully-decodable indicia or the partially-decodable indicia in the captured images. In some examples, the method 400 may identify the object in each of the sequentially captured images by identifying image features associated with the object and determining the direction of movement of the object along the scan path from these image features. Example image features include edges of the object, text associated with the object, and color, hue, or saturation associated with the object.

False detections of object movement can result in incorrectly determining a scan path or prolonging the processing time needed to determine a scan path. Therefore, in some examples, the method 400 (at block 408) may determine the direction of movement of the object along the scan path by analyzing a threshold number, n, of sequentially captured images, for example, n equal to or greater than 5 or 10. If after a predetermined timeout period, the object is not tracked across a threshold number of sequentially captured images, the block 406 may enter into a mitigating operation at the imaging assembly, for example providing an audible indicator or a visual indicator to a user of an error. Other mitigating operations at the block 406 may include communicating an error signal to a remote processing station or generating instructions to adjust parameters of the imaging assembly, such as illumination parameters implemented at the block 404. In some examples, prior to, after, or in place of performing these mitigating operations, if the method 400 fails to determine a scan path direction at the block 406, the method 400 may revert back to execution of the block 404 and capture additional images.

With the direction of movement of the object along the scan path determined, the method 400 (at block 408) determines which side of the imaging assembly is the lead-in scan side and/or which side is the lead-out scan side. That is, the block 408 determines the object scan path is from left-to-right or right-to-left. Further, in some examples, the block 408 determines if the scan path is from a distal distance in front of the imaging assembly to a proximal distance thereby indicating that the object is not scanned across a FOV but scanned from a farther distance to a closer distance, as would be the case for an imaging assembly in a presentation orientation.

The block 408 may determine the lead-in scan side and/or the lead-out scan side from a presumed reference position of a user scanning the object, for example. Similarly, the block 408 may identify a scan path from a distal position to a proximal position from a presumed reference position of a user scanning the object.

In some examples, the method 400 (e.g., at the block 408) may generate a scan direction indication that is displayed on the imaging assembly for instructing the user on the proper scan path. In some examples, such as when a scan direction determination means the physical placement of the imaging assembly should be changed, the method 400 may generate (and display) an instruction to change the physical orientation of the imaging assembly. The later may be performed by a block 410 described further below.

The determined lead-in scan side and/or lead-out scan side data from block 408 are fed to a block 410 for use in adjusting operating parameters of the imaging assembly from one scan path dependent configuration to another scan path dependent configuration. In the example of FIG. 5, the block 410 is implemented at least partially at the wakeup module 214b, which determines adjustments to its operating parameters based on the received data. For example, the wakeup module 214b may adjust its operating parameters from a right scan side sensitive configuration in which the imaging assembly is configured to perform a wakeup in response to objects entering from a right scan side and not from objects entering from the left scan side, to a left side sensitive configuration where the imaging assembly is configured to perform a wakeup in response to objects entering from the left scan side and not from objects entering from the right scan side, or vice versa.

In the illustrated example, the block 410 configures the imaging assembly into one of three different scan path dependent configurations: a wakeup configuration with left side sensitivity 412, a wakeup configuration with right side sensitivity 414, and a wakeup configuration with higher central (on axis) sensitivity 416. After the method 400 enters the wakeup module 214b into one of these configurations, the imaging assembly (at block 418) may capture subsequent image data according to the configuration. Furthermore, in some examples, the imaging assembly may determine (at an optional block 420) to reassess scan path orientation periodically, such as every additional, x, numbers of scan events at the imaging assembly. In such examples, control may be returned to one or more of the blocks 404, 406, 408, or 410.

The scan path dependent configurations 412, 414, and 416 may take any of a number of different forms. In some examples, the left side sensitive configuration 412 has operating parameters that configure the imaging assembly to detect for objects appearing in a corresponding left side of an image sensor. For example, an image sensor may be separated into segments, such as a left side segment and a right side segment and, in some examples, an additional central segment. In the configuration 412, only objects appearing in the left side segment of the image sensor are detected for wakeup. In the configuration 414, only objects appearing in the right side segment of the image sensor are detected for wakeup. In the configuration 416, only objects appearing in a central segment of the image sensor are detected for wakeup. In some examples, these scan path dependent configurations 412, 414, and 416 may include providing illumination to a corresponding region of a FOV of the imaging assembly, i.e., a left side of the FOV, a right side of the FOV, or a central portion of the FOV. Further still, in examples with multiple imaging sensors, the scan path dependent configurations 412, 414, and 416 may use only certain of the imaging sensors to perform wakeup operations.

In some examples, the method 400 determines at the block 406 scan speed of the object and communicates that scan speed to the block 410 which uses that information along with determined lean-in scan side and lead-out scan side to determine adjustments to operating parameters of the imaging assembly from one scan path dependent configuration to another scan path dependent configuration.

Figure 6:
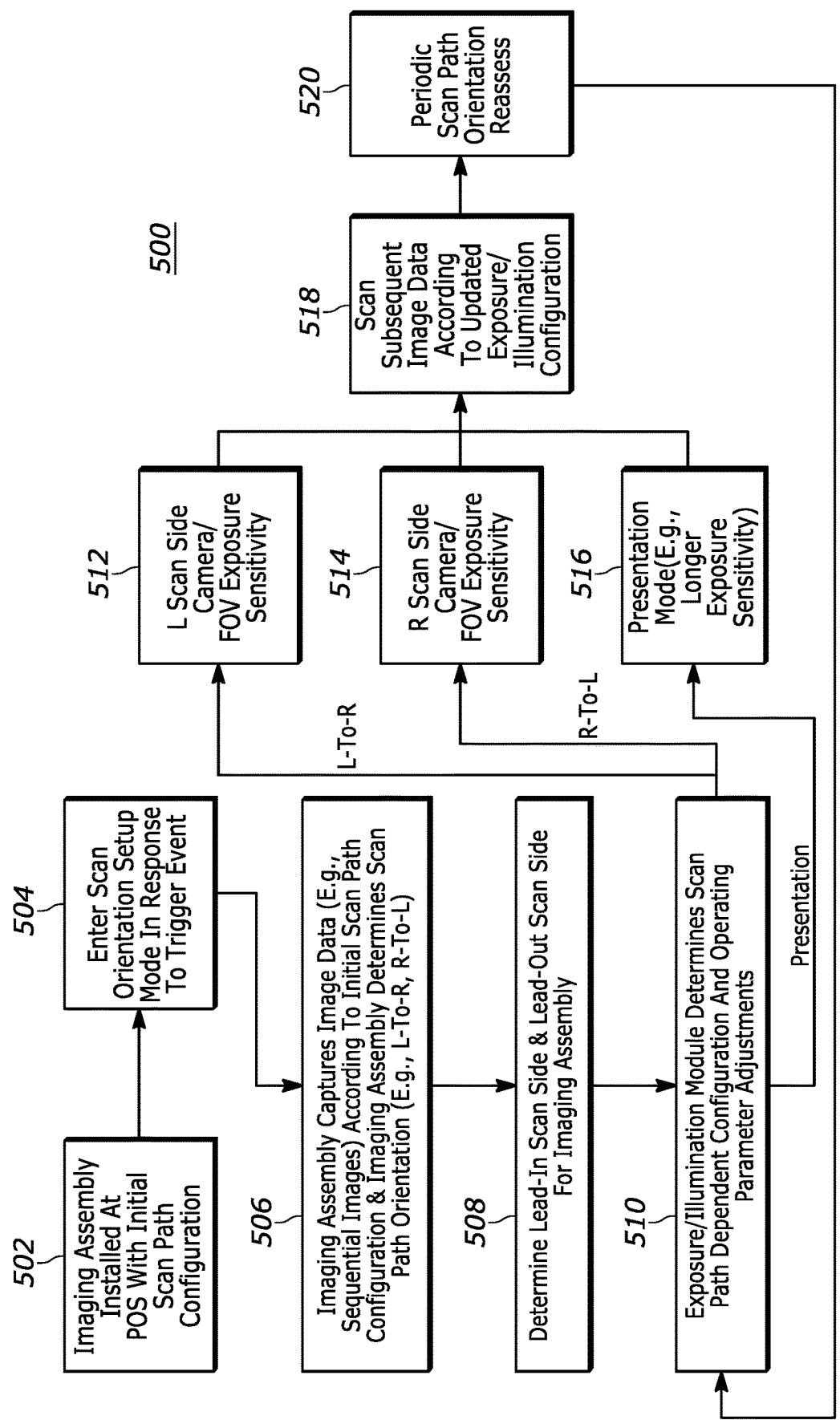
FIG. 6 illustrates an example method for adjusting imaging system exposure/illumination control depending on scan path orientation, in accordance with embodiments disclosed herein.

FIG. 6 illustrates another example method 500 for detecting a scan approach path of an object and adjusting another type of configuration of an imaging assembly based on that detected path, in accordance with embodiments disclosed herein. It should be appreciated that the actions described herein in reference to the example method 500 of FIG. 6 may be performed by any suitable components described herein, such as indicia readers 100, 150, and 300, logic circuit 210, and/or combinations thereof.

In the illustrated example, the method 500 includes similar initial processes to those of the method 400. For example, the processes at blocks 502, 504, 506, and 508 may be the same as those of blocks 402, 404, 406, and 407, respectively. Therefore, any of the various processes described in the method 400 may apply to these corresponding processes in the method 500. For example, as with block 402, the block 502 may include installing an imaging assembly (e.g., a bioptic indicia reader, slot scanner, machine vision camera, or other imaging-based data capture device, etc.) at point of sale (POS) location. At a block 504, the method 500 may enter a scan orientation setup mode in response to a trigger such as via a user pulling a physical trigger on an indicia decoder, detection of the presence of an object entering a field of view of the imaging assembly, successfully scanning a barcode, either on the object or a specifically encoded setup barcode. A block 506 begins capturing image data, for example, by emitting, using an illumination source of the imaging assembly, illumination oriented towards the entire field of view of the imaging assembly or directed to an initial presumptive object scan side of the imaging assembly. At the block 506, the method 500 may perform object recognition on the captured images detecting the desired object in each of the sequentially captured images and determining a direction of movement of the object along a scan path within the scan region. That is, the block 506 determines if the object is being scanned from left-to-right, right-to-left, or along some central axis toward or away from am imaging assembly.

As with the blocks 404 and 406, the blocks 504 and 506 are shown separately. However, the method 500 may be executed with one or more of the operations of these blocks combined. Further, in various examples, the method 500 may identify the same object in each of the sequentially captured images by detecting an indicia (e.g., a fully-decodable indicia or a partially-decodable indicia) associated with the object in the captured images. From that, the method 500 may determine the direction of movement of the object along the scan path by determining a position of the fully-decodable indicia or the partially-decodable indicia in the captured images. In some examples, the method 500 may identify the object in each of the sequentially captured images by identifying image features associated with the object and determining the direction of movement of the object along the scan path from these image features. Example image features include edges of the object, text associated with the object, and color, hue, or saturation associated with the object.

With the direction of movement of the object along the scan path determined, the method 500 (at block 508) determines which side of the imaging assembly is the lead-in scan side and/or which side is the lead-out scan side. That is, the block 508 determines the object scan path is from left-to-right or right-to-left. Further, in some examples, the block 508 determines if the scan path is from a distal distance in front of the imaging assembly to a proximal distance thereby indicating that the object is not scanned across a FOV but scanned from a farther distance to a closer distance, as would be the case for an imaging assembly in a presentation mode configuration.

The determined lead-in scan side and/or lead-out scan side data from block 508 are fed to a block 510 for use in adjusting operating parameters of the imaging assembly from one scan path dependent configuration to another scan path dependent configuration. In the example of FIG. 6, the block 510 is implemented at least partially at the exposure/illumination module 214c, which determines adjustments to its operating parameters based on the received data. In the illustrated example, the exposure/illumination module 214c is operating in an exposure mode at the block 510. In this mode, the exposure/illumination module 214c may adjust its operating parameters from a right scan side exposure configuration (514) to a left scan side exposure configuration (512) or vice versa. In the right scan side exposure configuration 514, the imaging sensor 202a is configured to examine objects appearing in a right side portion of an imager sensor and not examine objects appearing in a left side portion of the imager sensor. The converse would be the case for a left scan side exposure configuration 512. In examples, where the block 508 determines that the scan path is from a distal distance in front of the imaging assembly to a proximal distance thereby indicating that the object is not scanned across a FOV but scanned from a farther distance to a closer distance, as would be the case for an imaging assembly in a presentation orientation, the exposure/illumination module 214c may adjust its operating parameters to place the imaging assembly in a presentation mode configuration 516, where only objects appearing in a central portion of the imager sensor are detected.

In some examples, the exposure mode of the block 510 may include illumination configurations, as well. Or at the block 510, the exposure/illumination module 214c may operate in an illumination mode. In either example, the exposure/illumination module 214c may adjust its operating parameters from a right scan side illumination configuration to a left scan side illumination configuration or vice versa. In the right scan side illumination configuration, the illumination source 206 may be configured to illuminate a right side of a FOV of the imaging assembly and not illuminate a left side of the FOV of the imaging assembly. This may be achieved by having multiple illumination sources forming the source 206. In examples where the imaging assembly has multiple FsOV, like the imaging assembly 300 in FIG. 4, the method 500 (at block 510) may select to illuminate one of the FsOV 304, 306, or 308, depending on the configuration determined. That is, in some examples, the configuration 512 includes one or both of exposure and illumination bias toward the left side of the imaging assembly, the configuration 514 includes one or both of exposure and illumination bias toward the right side of the of the imaging assembly, and the configuration 516 includes one or both of exposure and illumination bias toward a central portion of the FOV of the imaging assembly. In examples with multiple imaging sensors, the scan path dependent configurations 512, 514, and 516 may perform scan side dependent capture of image data corresponding to only certain ones of the imaging sensors, corresponding to the scan side bias.

After the method 500 enters the exposure/illumination module 214c into one of these configurations, the imaging assembly (at block 518) may capture subsequent image data according to the exposure configuration. Furthermore, in some examples, the imaging assembly may determine (at an optional block 520) to reassess scan path orientation periodically, such as every additional, x, numbers of scan events at the imaging assembly. In such examples, control may be returned to one or more of the blocks 504, 506, 508, or 510.

Figure 7:
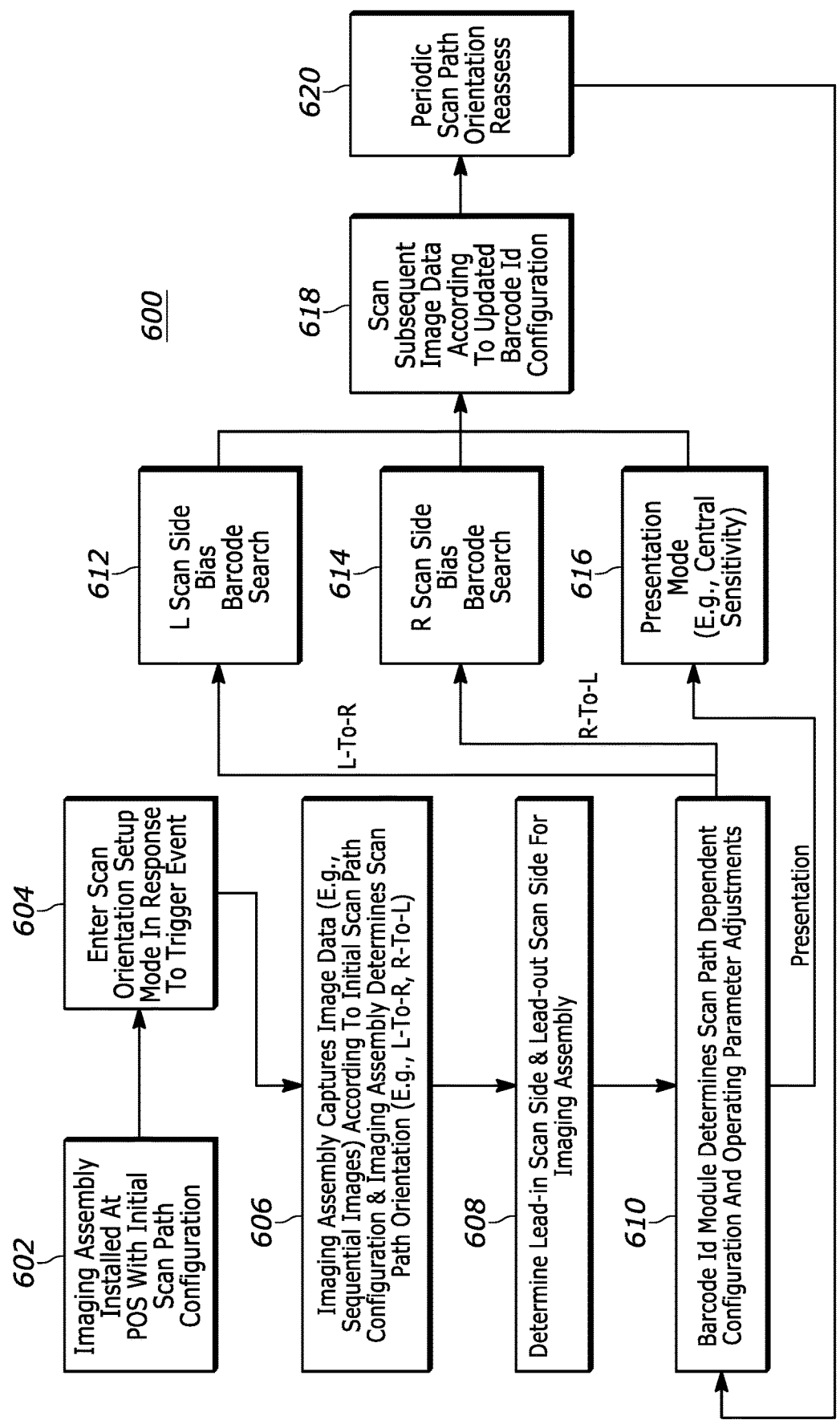
FIG. 7 illustrates an example method for adjusting barcode identification algorithms depending on scan path orientation, in accordance with embodiments disclosed herein.

FIG. 7 illustrates another example method 600 for detecting a scan approach path of an object and adjusting another type of configuration of an imaging assembly based on that detected path, in accordance with embodiments disclosed herein. It should be appreciated that the actions described herein in reference to the example method 600 of FIG. 7 may be performed by any suitable components described herein, such as indicia readers 100, 150, and 300, logic circuit 210, and/or combinations thereof.

In the illustrated example, the method 600 includes similar initial processes to those of the method 400. For example, the processes at blocks 602, 604, 606, and 608 may be the same as those of blocks 402, 404, 406, and 407, respectively. Therefore, any of the various processes described in the method 400 may apply to these corresponding processes in the method 600. For example, as with block 402, the block 602 may include installing an imaging assembly (e.g., a bioptic indicia reader, slot scanner, machine vision camera, or other imaging-based data capture device, etc.) at point of sale (POS) location. At a block 604, the process 600 may enter a scan orientation setup mode in response to a trigger such as via a user pulling a physical trigger on an indicia decoder, detection of the presence of an object entering a field of view of the imaging assembly, successfully scanning a barcode, either on the object or a specifically encoded setup barcode. A block 606 begins capturing image data, for example, by emitting, using an illumination source of the imaging assembly, illumination oriented towards the entire field of view of the imaging assembly or directed to an initial presumptive object scan side of the imaging assembly. At the block 606, the process 600 may perform object recognition on the captured images detecting the desired object in each of the sequentially captured images and determining a direction of movement of the object along the scan path within the scan region. That is, the block 506 determines if the object is being scanned from left-to-right, right-to-left, or along some central axis toward or away from am imaging assembly.

As with the blocks 404 and 406, the blocks 604 and 606 are shown separately. However, the process 600 may be executed with one or more of the operations of these blocks combined. Further, in various examples, the method 600 may identify the same object in each of the sequentially captured images by identifying a fully-decodable indicia associated with the object or a partially-decodable indicia associated with the object in the captured images. From that, the method 600 may determine the direction of movement of the object along the scan path by determining a position of the fully-decodable indicia or the partially-decodable indicia in the captured images. In some examples, the method 500 may identify the object in each of the sequentially captured images by identifying image features associated with the object and determining the direction of movement of the object along the scan path from these image features. Example image features include edges of the object, text associated with the object, and color, hue, or saturation associated with the object.

With the direction of movement of an object along the scan path determined, the method 600 (at block 608) determines which side of the imaging assembly is the lead-in scan side and/or which side is the lead-out scan side. That is, the block 608 determines the object scan path is from left-to-right or right-to-left. Further, in some examples, the block 608 determines if the scan path is from a distal distance in front of the imaging assembly to a proximal distance thereby indicating that the object is not scanned across a FOV but scanned from a farther distance to a closer distance, as would be the case for an imaging assembly in a presentation orientation.

The determined lead-in scan side and/or lead-out scan side data from block 608 are fed to a block 610 for use in adjusting operating parameters of the imaging assembly from one scan path dependent configuration to another scan path dependent configuration. In the example of FIG. 7, the block 610 is implemented at least partially at the barcode ID module 214d, which determines adjustments to its operating parameters based on the received data.

In the illustrated example, the barcode ID module 214d may adjust its operating parameters from a left side bias barcode search algorithm configuration 612 to a right side bias barcode search algorithm configuration 614 or vice versa. In some examples, when in the left side bias barcode search algorithm configuration 612, the barcode ID module 214d is configured to search for barcodes (or other indicia) in a left side portion of an imager sensor and not search for barcodes appearing in a right side portion of the imager sensor. Or, in some examples, the barcode ID module 214d searches for barcodes in left side of the FsOV and not in a right side of the FsOV, in the configuration 612. The converse would be the case for the right side bias barcode search algorithm configuration 614. In some examples, the barcode ID module 214d applies these left side and right side biases by first searching for barcodes in the respective sides of the captured image data (or FsOV) and upon not finding a barcode after a number of image frames, then searching for barcodes in the other side of the captured image data. For example, in some examples, only certain portions of the captured image data (or portions of the FsOV) are searched for barcodes, while in some other examples, the entire captured image data (or all FsOV) may be searched, but with portions searched in a prioritized order based on the determined scan path for the imaging assembly. In examples with multiple imaging sensors, the scan path dependent configurations 612, 614, and 616 may apply respective biases by scanning for and decoding barcodes that appear in image data captured from only certainly of the imaging sensors, corresponding to the scan side bias.

In examples, where the block 608 determines that the scan path is from a distal distance in front of the imaging assembly to a proximal distance thereby indicating that the object is not scanned across a FOV but scanned from a farther distance to a closer distance, as would be the case for an imaging assembly in a presentation orientation, the barcode ID module 214d may adjust its operating parameters to place the imaging assembly in the presentation mode configuration 616, where the imaging assembly only searches a central portion of the captured image data for barcodes or where the central portion is searched before other portions of the captured image data.

After the method 600 enters the barcode ID module 214d into one of these configurations, the imaging assembly (at block 618) may capture subsequent image data according to the exposure configuration. Furthermore, in some examples, the imaging assembly may determine (at an optional block 620) to reassess scan path orientation periodically, such as every additional, x, numbers of scan events at the imaging assembly. In such examples, control may be returned to one or more of the blocks 604, 606, 608, or 610.

Figure 8:
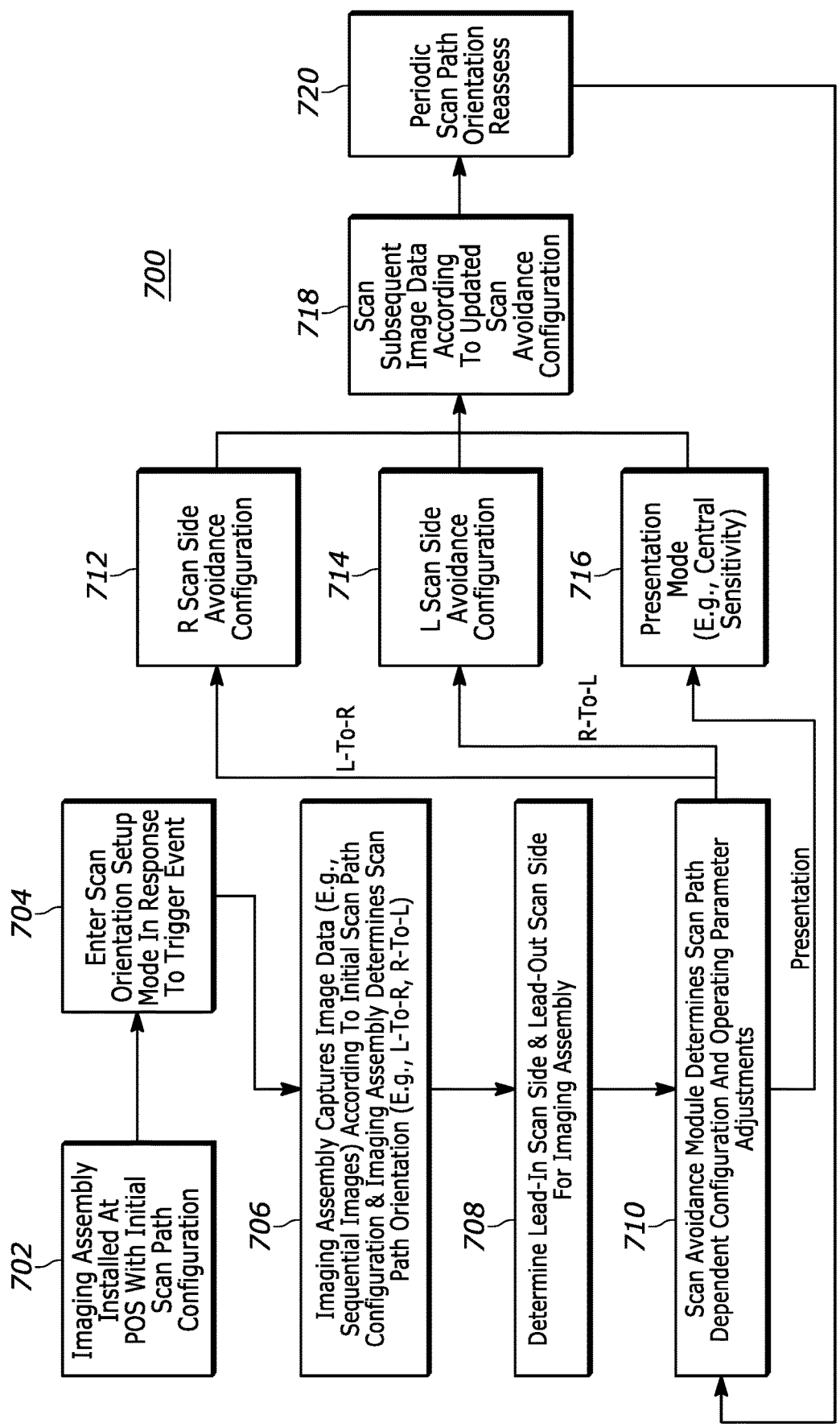
FIG. 8 illustrates an example method for adjusting scan avoidance operations by an imaging based on scan path orientation, in accordance with embodiments disclosed herein.

FIG. 8 illustrates another example method 700 for detecting a scan approach path of an object and adjusting another type of configuration of an imaging assembly based on that detected path, in accordance with embodiments disclosed herein. It should be appreciated that the actions described herein in reference to the example method 700 of FIG. 8 may be performed by any suitable components described herein, such as indicia readers 100, 150, and 300, logic circuit 210, and/or combinations thereof.

In the illustrated example, the method 700 includes similar initial processes to those of the method 400. For example, the processes at blocks 702, 704, 706, and 708 may be the same as those of blocks 402, 404, 406, and 407, respectively. Therefore, any of the various processes described in the method 400 may apply to these corresponding processes in the method 700. For example, as with block 402, the block 702 may include installing an imaging assembly (e.g., a bioptic indicia reader, slot scanner, machine vision camera, or other imaging-based data capture device, etc.) at point of sale (POS) location. At a block 704, the process 700 may enter a scan orientation setup mode in response to a trigger such as via a user pulling a physical trigger on an indicia decoder, detection of the presence of an object entering a field of view of the imaging assembly, successfully scanning a barcode, either on the object or a specifically encoded setup barcode. A block 706 begins capturing image data, for example, by emitting, using an illumination source of the imaging assembly, illumination oriented towards the entire field of view of the imaging assembly or directed to an initial presumptive object scan side of the imaging assembly. At the block 706, the process 700 may perform object recognition on the captured images detecting the desired object in each of the sequentially captured images and determining a direction of movement of the object along a scan path within the scan region. That is, the block 706 determines if the object is being scanned from left-to-right, right-to-left, or along some central axis toward or away from am imaging assembly.

As with the blocks 404 and 406, the blocks 704 and 706 are shown separately. However, the method 700 may be executed with one or more of the operations of these blocks combined. Further, in various examples, the method 700 may identify the same object in each of the sequentially captured images by detecting an indicia (e.g., a fully-decodable indicia or a partially-decodable indicia) associated with the object in the captured images. From that, the method 700 may determine the direction of movement of the object along the scan path by determining a position of the fully-decodable indicia or the partially-decodable indicia in the captured images. In some examples, the method 700 may detect the object in each of the sequentially captured images by identifying image features associated with the object and determining the direction of movement of the object along the scan path from these image features. Example image features include edges of the object, text associated with the object, and color, hue, or saturation associated with the object.

With the direction of movement of the object along the scan path determined, the method 700 (at block 708) determines which side of the imaging assembly is the lead-in scan side and/or which side is the lead-out scan side. That is, the block 708 determines the object scan path is from left-to-right or right-to-left. Further, in some examples, the block 708 determines if the scan path is from a distal distance in front of the imaging assembly to a proximal distance thereby indicating that the object is not scanned across a FOV but scanned from a farther distance to a closer distance, as would be the case for an imaging assembly in a presentation orientation.

The determined lead-in scan side and/or lead-out scan side data from block 708 are fed to a block 710 for use in adjusting operating parameters of the imaging assembly from one scan path dependent configuration to another scan path dependent configuration. In the example of FIG. 8, the block 710 is implemented at least partially at the scan avoidance module 214e, which determines adjustments to its operating parameters based on the received data.

In the illustrated example, the scan avoidance module 214e may adjust its operating parameters from a right side avoidance configuration 712 to a left side avoidance configuration 714 or vice versa. In some examples, when in the right side avoidance configuration 712, the scan avoidance module 214e is configured to discard decode barcodes that appeared in mage data corresponding to a right side of the FsOV of the imaging assembly when decode. Similarly, the left side avoidance configuration 714 discards decoded barcodes appearing in image data corresponding to the left side of the FsOV of the imaging assembly. In examples, where the block 708 determines that the scan path is from a distal distance in front of the imaging assembly to a proximal distance thereby indicating that the object is not scanned across a FOV but scanned from a farther distance to a closer distance, as would be the case for an imaging assembly in a presentation orientation, the scan avoidance module 214e may adjust its operating parameters to place the imaging assembly in the presentation mode configuration 716, where the imaging assembly discards decode barcodes that appear in side portions of the FsOV.

This, in some examples, the configurations 712, 714, and 716 configure the imaging assembly to discard decode barcodes depending on where in FsOV the barcode appeared, based on the scan path approach for that imaging assembly. That way, the payloads of these improperly decoded barcodes are not sent to a point of sale system for affecting a transaction. In some examples, instead of discarding the decode barcode payloads, the configurations 712, 714, and 716 may instruct the imaging assembly to flag the payloads with a data flag and either locally store the payloads or send the payloads to an external system for making further determinations based on the improperly decoded barcodes. In some examples, the improperly decode barcodes may be communicated to the block 710 or to a block 720 (discussed below) for reassessing a scan path approach. Thus, with these configurations, only certain portions of the FsOV may be used for decoding a barcode, and barcodes appearing in other portions may be decoded, but that decode event is not used to affect a transaction at a point of sale.

In examples with multiple imaging sensors, the scan path dependent configurations 712, 714, and 716 may apply respective scan avoidance operations to image data captured from certain imaging sensors, corresponding to the scan side bias, and not from other imaging sensors.

After the method 700 enters the scan avoidance module 214d into one of these configurations, the imaging assembly (at block 718) may capture subsequent image data according to the exposure configuration. Furthermore, in some examples, the imaging assembly may determine (at an optional block 720) to reassess scan path orientation periodically, such as every additional, x, numbers of scan events at the imaging assembly. In such examples, control may be returned to one or more of the blocks 704, 706, 708, or 710.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Thus, the following claims are hereby incorporated into the Detailed Description, with each claim standing on its own as a separately claimed subject matter.

The invention claimed is:

1. A computer-implemented method to detect for a scan approach path for an imaging assembly, the method comprising:
   capturing, via the imaging assembly, image data of an object appearing one or more fields of view (FsOV), wherein the image data comprises a plurality of sequentially captured images of the object in the one or more FsOV, the one or more FsOV defining a scan region having a first scan side and a second scan side opposite the first scan side;
   detecting, at one or more processors, the object in at least some of the sequentially captured images and determining, at the one or more processors, a direction of movement of the object along a scan path within the scan region;
   from the direction of movement of the object, determining, at the one or more processors, which of the first scan side and the second scan side is a lead-in scan side and/or which of the first scan side and the second scan side is lead-out scan side;
   responsive to determining the lead-in scan side and/or the lead-out scan side, adjusting, at the one or more processors, operating parameters of the imaging assembly from a first scan path dependent configuration to a second scan path dependent configuration; and
   capturing, via the imaging assembly having the second scan path dependent configuration, subsequent image data over the one or more FsOV.

2. The computer-implemented method of claim 1, wherein detecting the object in each of the sequentially captured images comprises detecting an indicia associated with the object; and wherein determining the direction of movement of the object is determined from determining a position of the indicia in each of the sequentially captured images.

3. The computer-implemented method of claim 1, wherein detecting the object in each of the sequentially captured images comprises identifying image features associated with the object; and wherein determining the direction of movement of the object is determined from determining a position of the image features in each of the sequentially captured images.

4. The computer-implemented method claim 3, wherein the image features are selected from the group consisting of edges of the object, text associated with the object, and color, hue, or saturation associated with the object.

5. The computer-implemented method of claim 1, further comprising determining the direction of movement of the object from analyzing a threshold number of sequentially captured images.

6. The computer-implemented method of claim 5, wherein the sequentially captured images are continuously captured images.

7. The computer-implemented method of claim 5, wherein the threshold number of sequentially captured images are a first n images captured by the imaging assembly after an initiating event at the imaging assembly, where n is an integer less than 10.

8. The computer-implemented method of claim 1, wherein the operating parameters of the imaging assembly comprise a wakeup property, an imaging sensor exposure property, an illumination property, a barcode identification property, or a scan avoidance property.

9. The computer-implemented method of claim 8, wherein the operating parameters comprise the wakeup property, and wherein in the first scan path dependent configuration the imaging assembly is configured to perform a wakeup in response to an initial object entering the scan region from the first scan side and not from the initial object entering the scan region from the second scan side, and wherein in the second scan path dependent configuration the imaging assembly is configured to perform a wakeup in response to objects entering from the second scan side and not from objects entering from the first scan side.

10. The computer-implemented method of claim 8, wherein the operating parameters comprise the imaging sensor exposure property, and wherein in the first scan path dependent configuration the imaging assembly is configured to examine a portion of the image data corresponding to the first scan side of the scan region in detecting a subsequent object and to not examine a portion of the subsequent image data corresponding to the second scan side of the scan region.

11. The computer-implemented method of claim 8, wherein the operating parameters comprise the imager illumination property, and wherein in the first scan path dependent configuration the imaging assembly is configured to illuminate a portion of the one or more FsOV corresponding to the first scan side of the scan region in detecting a subsequent object and to not illuminate a portion of the FsOV corresponding to the second scan side of the scan region.

12. The computer-implemented method of claim 8, wherein the operating parameters comprise the barcode identification property, and wherein in the first scan path dependent configuration the imaging assembly is configured to identify a barcode appearing in a portion of the subsequent image data corresponding to the first scan side of the scan region and to not identify a barcode appearing in a portion of the subsequent image data corresponding to the second scan side of the scan region.

13. The computer-implemented method of claim 8, wherein the operating parameters comprise the scan avoidance property, and wherein in the first scan path dependent configuration the imaging assembly is configured to avoid performing scanning processing on objects appearing in the portion of the subsequent image data corresponding to the lead-out scan side.

14. The computer-implemented method of claim 13, further comprising determining a number, n, of sequentially captured images in the subsequent image data that contain an object in the portion of the subsequent image data corresponding to the first scan side; and in response to n being less than a threshold, performing a mitigating operation at the imaging assembly.

15. The computer-implemented method of claim 14, wherein the mitigating operation is one or more of an audible indicator, a visual indicator, communicating an error signal to a remote processing station, or further adjusting the operating parameters of the imaging assembly.

16. The computer-implemented method of claim 1, further comprises determining, at the one or more processors, a scan speed of the object within the scan region; and wherein adjusting the operating parameters of the imaging assembly from the first scan path dependent configuration to the second scan path dependent configuration depends upon the scan speed.

17. The computer-implemented method of claim 1, further comprising responsive to adjusting the operating parameters of the imaging assembly from the first scan path dependent configuration to the second scan path dependent configuration, generating a scan direction indication to a user or an instruction to change an orientation of the imaging assembly.

18. The computer-implemented method of claim 1, wherein the first scan side is a left side the scan region and wherein the second scan side is a right side of the scan region.

19. The computer-implemented method of claim 1, wherein the first scan side is a distal position of the scan region and wherein the second scan side is a proximal position of the scan region.

20. A device for detecting a scan approach path for an imaging assembly, the device comprising:
   one or more processors; and
   one or more memories storing instructions thereon that, when executed by the one or more processors, are configured to cause the one or more processors to:
      capture, via the imaging assembly, image data of an object appearing one or more fields of view (FsOV), wherein the image data comprises a plurality of sequentially captured images of the object in the one or more FsOV, the one or more FsOV defining a scan region having a first scan side and a second scan side opposite the first scan side;
      detect, at one or more processors, the object in at least some of the sequentially captured images and determine, at the one or more processors, a direction of movement of the object within the scan region;
      from the direction of movement of the object, determine, at the one or more processors, which of the first scan side and the second scan side is a lead-in scan side and/or which of the first scan side and the second scan side is lead-out scan side;
      responsive to determining the lead-in scan side and/or the lead-out scan side, adjust, at the one or more processors, operating parameters of the imaging assembly from a first scan path dependent configuration to a second scan path dependent configuration; and
      capture, via the imaging assembly having the second scan path dependent configuration, subsequent image data over the one or more FsOV.

21. A tangible machine-readable medium comprising instructions for detecting a scan approach path for an imaging assembly that, when executed, cause a machine to at least:
   capture, via the imaging assembly, image data of an object appearing one or more fields of view (FsOV), wherein the image data comprises a plurality of sequentially captured images of the object in the one or more FsOV, the one or more FsOV defining a scan region having a first scan side and a second scan side opposite the first scan side;
   detect, at one or more processors, the object in each of the sequentially captured images and determine, at the one or more processors, a direction of movement of the object within the scan region;
   from the direction of movement of the object, determine, at the one or more processors, which of the first scan side and the second scan side is a lead-in scan side and/or which of the first scan side and the second scan side is lead-out scan side;
   responsive to determining the lead-in scan side and/or the lead-out scan side, adjust, at the one or more processors, operating parameters of the imaging assembly from a first scan path dependent configuration to a second scan path dependent configuration; and capture, via the imaging assembly having the second scan path dependent configuration, subsequent image data over the one or more FsOV.

\* \* \* \* \*